(12) United States Patent
Lemke et al.

(10) Patent No.: US 11,119,976 B2
(45) Date of Patent: Sep. 14, 2021

(54) STATEFUL CONTAINER MIGRATION

(71) Applicant: INTERNATIONAL BUSINESS MACHINES CORPORATION, Armonk, NY (US)

(72) Inventors: Christian Hendrik Lemke, Böblingen (DE); Boas Betzler, Waldenbuch (DE); Thomas Brackhahn, Eschborn (DE); Frank Schrode, Rottenburg (DE)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/580,637

(22) Filed: Sep. 24, 2019

(65) Prior Publication Data

US 2021/0089495 A1 Mar. 25, 2021

(51) Int. Cl.
*G06F 16/11* (2019.01)
*G06F 16/182* (2019.01)

(52) U.S. Cl.
CPC .......... *G06F 16/119* (2019.01); *G06F 16/183* (2019.01)

(58) Field of Classification Search
None
See application file for complete search history.

(56) References Cited

U.S. PATENT DOCUMENTS

| 9,858,123 | B1 | 1/2018 | Apostolos |
| 2016/0217050 | A1 | 7/2016 | Andrew |
| 2016/0330138 | A1 | 11/2016 | James |
| 2018/0032410 | A1 | 2/2018 | Hui |
| 2018/0232141 | A1 | 8/2018 | Amalia |

(Continued)

FOREIGN PATENT DOCUMENTS

WO 2018175864 A1 9/2018

OTHER PUBLICATIONS

S. Oh and J. Kim, "Stateful Container Migration employing Checkpoint-based Restoration for Orchestrated Container Clusters," 2018 International Conference on Information and Communication Technology Convergence (ICTC), Jeju, Korea (South), 2018, pp. 25-30, doi: 10.1109/ICTC.2018.8539562.*

(Continued)

*Primary Examiner* — Mark D Featherstone
*Assistant Examiner* — Samuel C Sharpless, III
(74) *Attorney, Agent, or Firm* — L. Jeffrey Kelly

(57) ABSTRACT

A computer-implemented method for migrating a source container with a running application to a target container may be provided. The method includes providing a source container motion daemon being executed in the source container management system, and a target container motion daemon being executed in the target container management system, and creating a host container hosting an encapsulated container environment in the target container management system. The host container is executing a host container motion daemon and the target container. The method also includes connecting a container motion controller to the source container motion daemon, the target container motion daemon and the host container motion daemon, and copying content of a source memory of the source container to a target memory via the source container motion daemon and the host container motion daemon under control of the container motion controller.

23 Claims, 7 Drawing Sheets

(56) References Cited

U.S. PATENT DOCUMENTS

2019/0065323 A1\* 2/2019 Dhamdhere ............ G06F 9/455
2019/0087118 A1\* 3/2019 Makin ................... G06F 3/0604
2019/0102265 A1\* 4/2019 Ngo .................... H04L 41/0803

OTHER PUBLICATIONS

Eagle et al., "Zerto reveals its vision for the future of consolidated data protection", 451 Research, Report Reprint, Jun. 21, 2018, 4 pages.
Mell et al., "The NIST Definition of Cloud Computing", NIST Special Publication 800-145, 2011, 7 pages.
Naim, "Building Globally Distributed Services using Kubernetes Cluster Federation", Oct. 14, 2016, 9 pages.

\* cited by examiner

STATEFUL CONTAINER MIGRATION

BACKGROUND

The invention relates generally to a computer implemented method, data processing system and computer program product for a stateful migration of a source container to a target container management system including a target file system. More specifically, this invention is related to a computer-implemented method for statefully migrating a source container with a running application from a source container management system to a target container management system including a target file system. The invention relates further to a container migration system for migrating a source container to a target container, and a related computer program product.

Deploying cloud computing based data centers today is a given for hyper-scalers, outsourcing companies, as well as for enterprise IT centers. After the wave of virtual machines (VM) deployment for a fast and easy setup of compute resources, the next step into ease-of-use, ease of deployment, ease of infrastructure management are software containers not carrying the operating system overhead—which may also be seen as burden—of complete virtual machines.

However, software containers—or simply containers—are per definition stateless. On the other side, traditional, as well as newly developed, applications are required to follow the known 12-factor methodology. This may also include the requirement for managing a status of a transaction and—if necessary—to be able to perform a rollback for the transaction if something went wrong in the database. If traditionally developed applications may be redeployed using container technology, it may be difficult to manage such statuses. On the other hand, it is one of the major advantages of containers to shut them down immediately if they are not required in order to save expenses for used infrastructure resources and redeploy the container potentially on a different server. Thus, one may say that resiliency and availability may be achieved by starting a new instance of the container which then is retrieving any application from a backing service. However, most applications today still keep the state on a local file system; however, in persistent volumes (being defined by PVC, persistent volume claim) or in memory, not all statuses may be factored out into attached backing services.

Often such traditional applications are redeployed in containers without modifications and, thus, cannot participate in the resilience and availability features provided by container management systems. In these cases, typical Virtual Machine (hereinafter "VM") hosted applications are re-hosted on containers, but the service features on virtual machines that were previously available may become unavailable when using containers. Hence, there is a major technical hurdle to move statuses of a running container from one host to another or even from one container service provider in one cloud computing environment to another.

A disadvantage of known solutions may be in the fact that a direct stateful migration of a software container from one container management system to another continues to be a challenge, sometimes solved by backup to a storage volume. However, this may be time-consuming and error-prone.

However, there may be a need to overcome the inherent stateless implementation of software container migrations which typically do not allow a stateful live-migration from one container management system to another.

SUMMARY

According to one aspect of the present invention, a computer-implemented method for migrating a source container with a running application from a source container management system to a target container management system including a target file system may be provided. The method may include providing a source container motion daemon being executed in the source container management system and a target container motion daemon being executed in the target container management system, and creating a host container hosting an encapsulated container environment in the target container management system, the host container being adapted for executing a host container motion daemon and the target container using a base image of the source container.

Additionally, the method may include connecting a container motion controller to the source container motion daemon, the target container motion daemon and the host container motion daemon, and copying content of a source memory of the source container to a target memory via the source container motion daemon and the host container motion daemon under control of the container motion controller.

According to another aspect of the present invention, a related container migration system for a migration of a source container to a target container may be provided. The migration of a source container with a running application may happen from a source container management system including a source file system, to a target container management system including a target file system. The container migration system may include a proving module adapted for providing a source container motion daemon being executed in the source container management system, and a target container motion daemon being executed in the target container management system, and a creation unit adapted for creating a host container hosting an encapsulated container environment in the target container management system, the host container being adapted for executing a host container motion daemon and the target container using a base image of the source container.

The container migration system may also include a connection unit adapted for connecting a container motion controller to the source container motion daemon, the target container motion daemon and the host container motion daemon, as well as a copy module adapted for copy content of a source memory of the source container to a target memory via the source container motion daemon and the host container motion daemon under control of the container motion controller.

It may be noted that the term 'container' may be used exchangeable with the term 'software container'.

The proposed computer-implemented method for migrating a source container with a running application from a source container management system to a target container management system including a target file system, may offer multiple advantages and technical effects:

A prominent aspect of the proposed concept may be in the ability to enable a live-migration from one container being executed in a container management system to another container management system being executed in a different environment, in a stateful way and without the requirement to exchange status information via slow storage systems.

The concept may rely on container motion daemons—one being executed in the source container environment, another one being executed in a target container environment, and a third one being executed in a host container encapsulating the target container—wherein both may be controlled by a container motion controller. Thereby, on the target side, a host container is executed in the target container management system. In the host container, the target container with a target memory and the target file system may be executed.

Thus, the target container may be encapsulated by the host container.

This nesting may allow for a complete live-migration of a container executing an application in the first source container management system to be executed in another (target) container management system without any interrupt and without losing its status.

The proposed concept may also work if the source container management system and the target container management system are not equal, i.e., they may be different. Additionally, the complete infrastructure below the container management system may be different, i.e., no binary compatible. This may be the case if different CPUs with different instruction sets may be used. During migration, a binary conversion of the container to be migrated may enable such a function.

There may also be a further advantage: Public cloud providers do typically not provide access to their container management systems. The here proposed method may allow to bypass the cloud provider container management system and enable a live-migration even without having direct access to the underlying container management systems of the public cloud computing provider.

In the following, additional embodiments of the inventive concept—applicable to the method as well as to the system—will be described.

According to one preferred embodiment, the method may also include discovering the source persistent volume of the source container using the source container motion daemon controlled by the container motion controller. This may be performed by accessing the persistent volume claim information of the source container. This information may be used for setting up the target container and the related persistent volume.

Thus, according to another preferred embodiment, the method may also include providing a target persistent volume in the target container management system corresponding to the source persistent volume by copying local disk paths from the source file system to the target file system. This way, an external access may not be able to differentiate between the source persistent volume and the target persistent volume after a successful migration of the container. It may look completely the same.

As a consequence, according to a useful embodiment, the method may also include coupling communicatively the target persistent volume to the target container. This way, a functionally complete container set-up may be performed.

According to one advantageous embodiment of the method, the copying content may also include coupling communicatively the source container motion daemon to the host container motion daemon. This communicative connection may be instrumental for a memory synchronization mechanism.

According to an additional, preferred embodiment, the method may also include updating dirty pages from the source container being executed in the source container management system to the target container. With this, the complete original environment of the source container may have been moved to the target container.

According to one permissive embodiment, the method may also include adapting a network flow to and from the source container to point into the target container. This may be required for a seamless transition of network data flows to/from the target software container.

According to one optional embodiment of the method, the source container management system may be different to the target container management system. Hence, the proposed concept may not be bound to one container management system on the source side and the target side only. Instead, a plurality of different container management systems may be used together with the proposed concept. In one useful embodiment of the method the source container management system and the target container management system may be Kubernetes®. Kubernetes is a registered trademark of the Linux Foundation. However, also other container management systems like Docker® or Openshift® may be used to manage the infrastructure and the environment of the source container, as well as the target container. Docker is a registered trademark of Docker, Inc. Openshift is a registered trademark of Red Hat, Inc. On the other side, the proposed method may also work if the source container management system and the target container management system are equal.

According to an additional embodiment of the method, the source file system may include a respective container base image, a source web-server, source middleware and the source container motion daemon. Furthermore, the target file system may include a respective container base image, a target web-server, target middleware and the target container motion daemon. Hence, both container management systems (source and target) may define its infrastructure completely to their individual needs.

According to one preferred embodiment, the method may further include setting the source container into a passive mode and setting the target container into an active mode. During this process also the state transfer from the source may happen. Hence, a transition from one container management environment to another container management environment may be enabled seamlessly and by keeping the actual status at the time of the migration.

According to a further advantageous embodiment, the method may additionally include using a binary conversion algorithm during copying content of a source memory of the source container to a target memory. Thus, the system supporting the source container (and which source container is being executed) and the system supporting the target container may not be required to be binary compatible. A conversion of the binary data relating to the source container to those required for the target container environment, potentially having different underlying infrastructure requirements, may be performed during the migration of the container from the source environment to the target environment. It may be performed by the container motion daemons or by related services.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
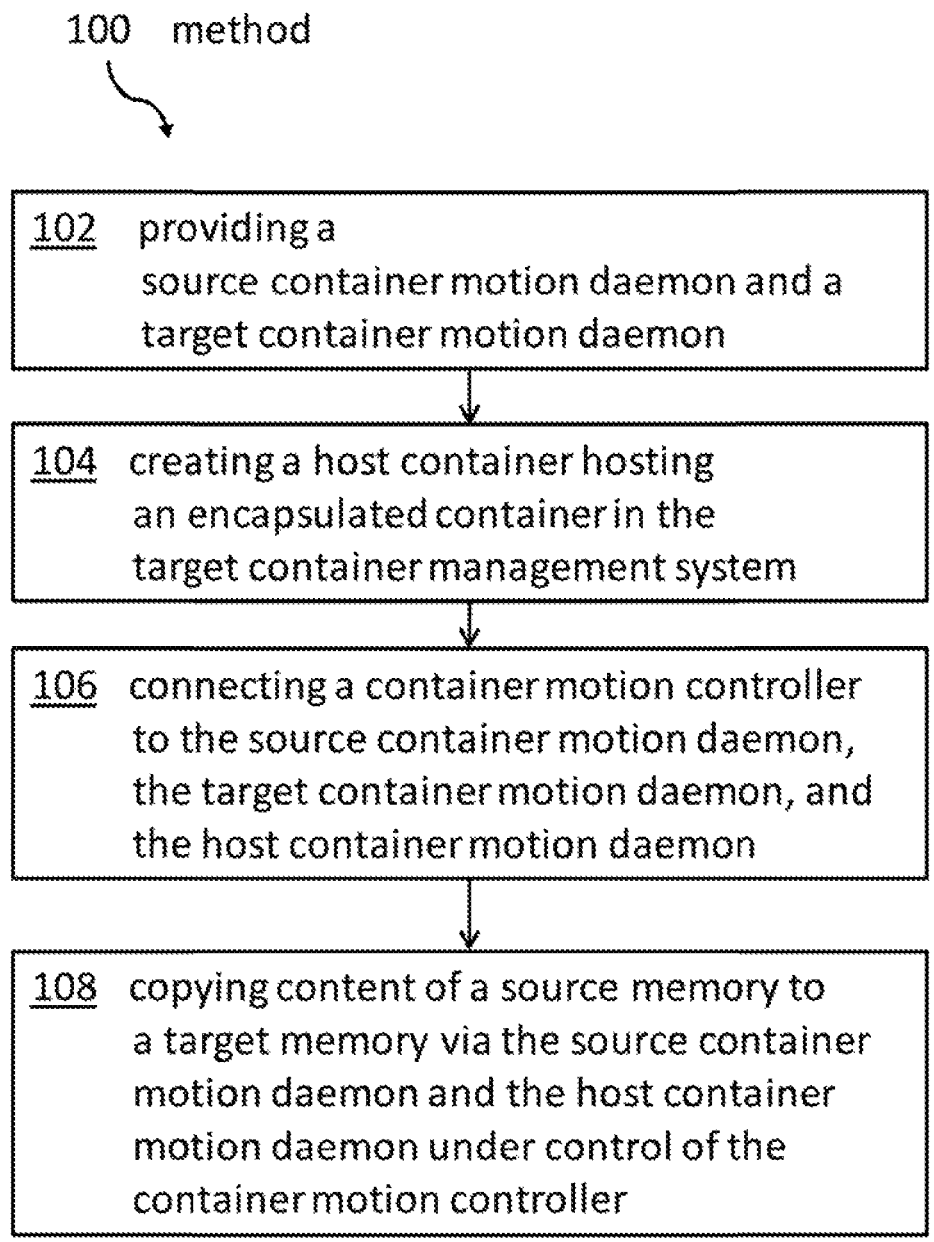
Figure 2:
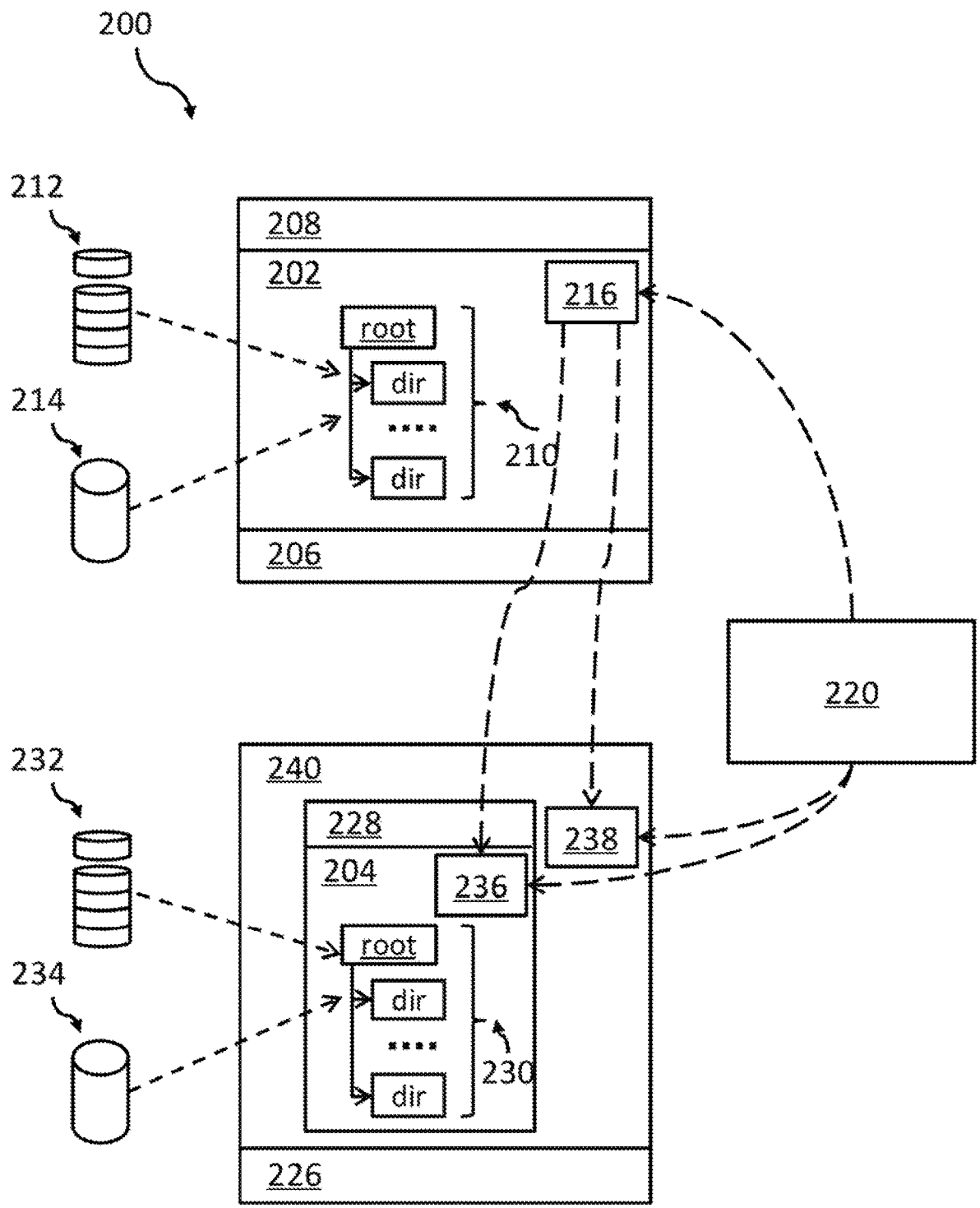
Figure 3:
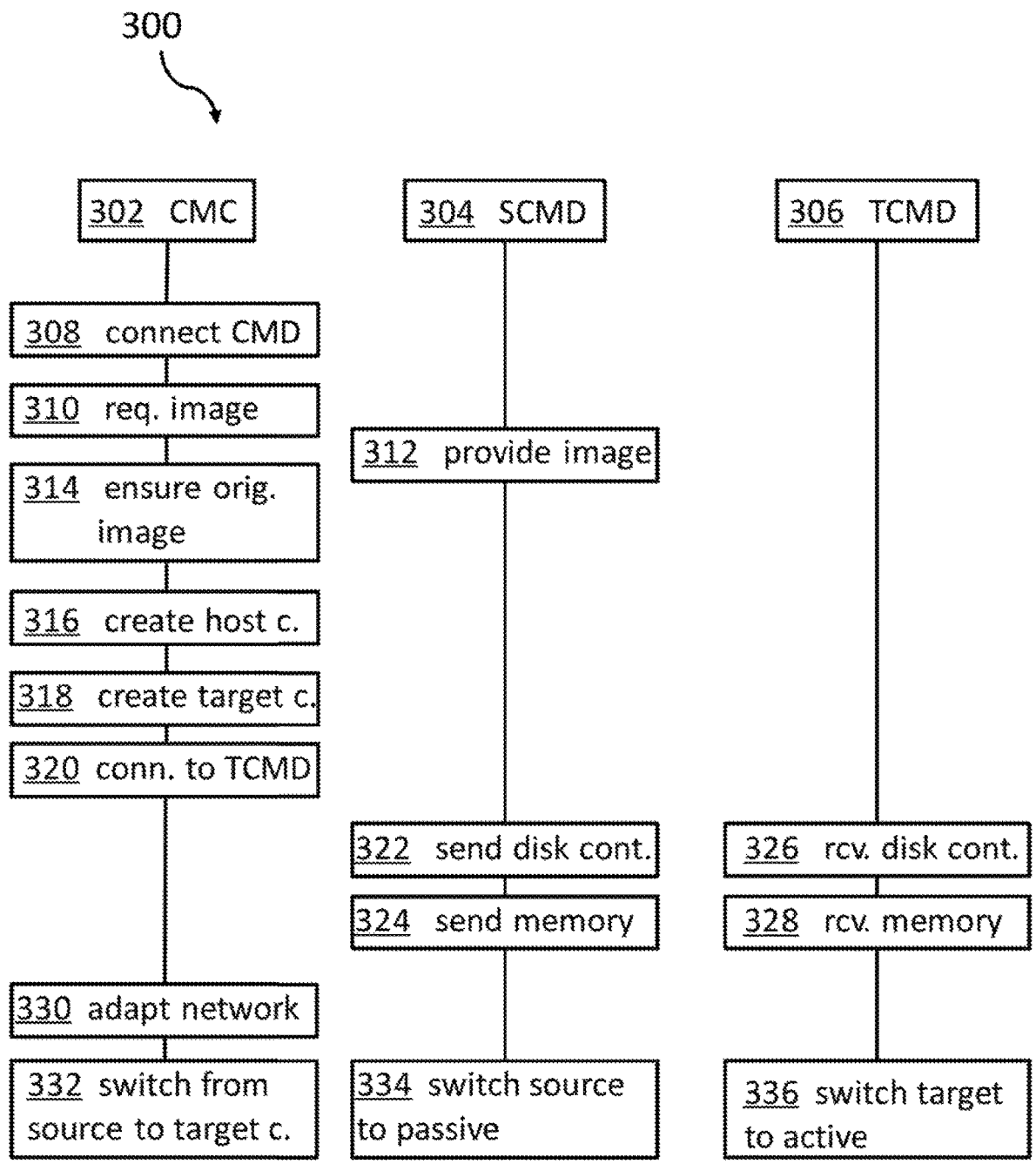
Figure 4:
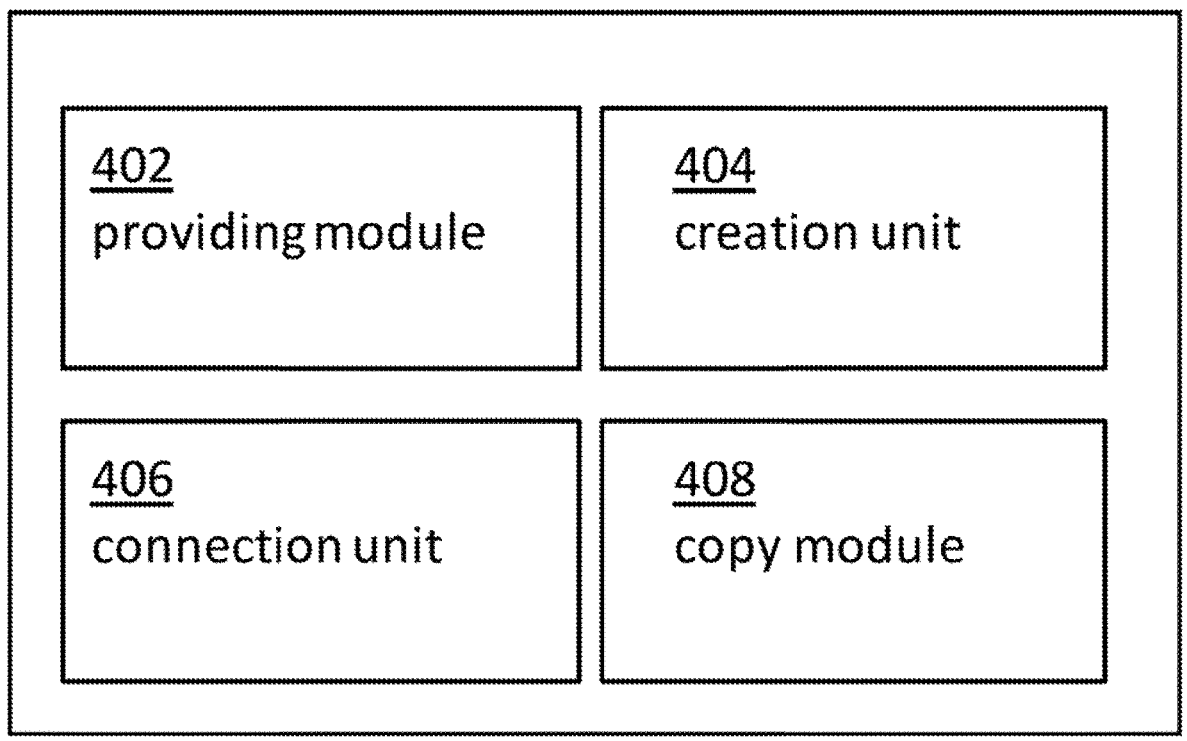
Figure 5:
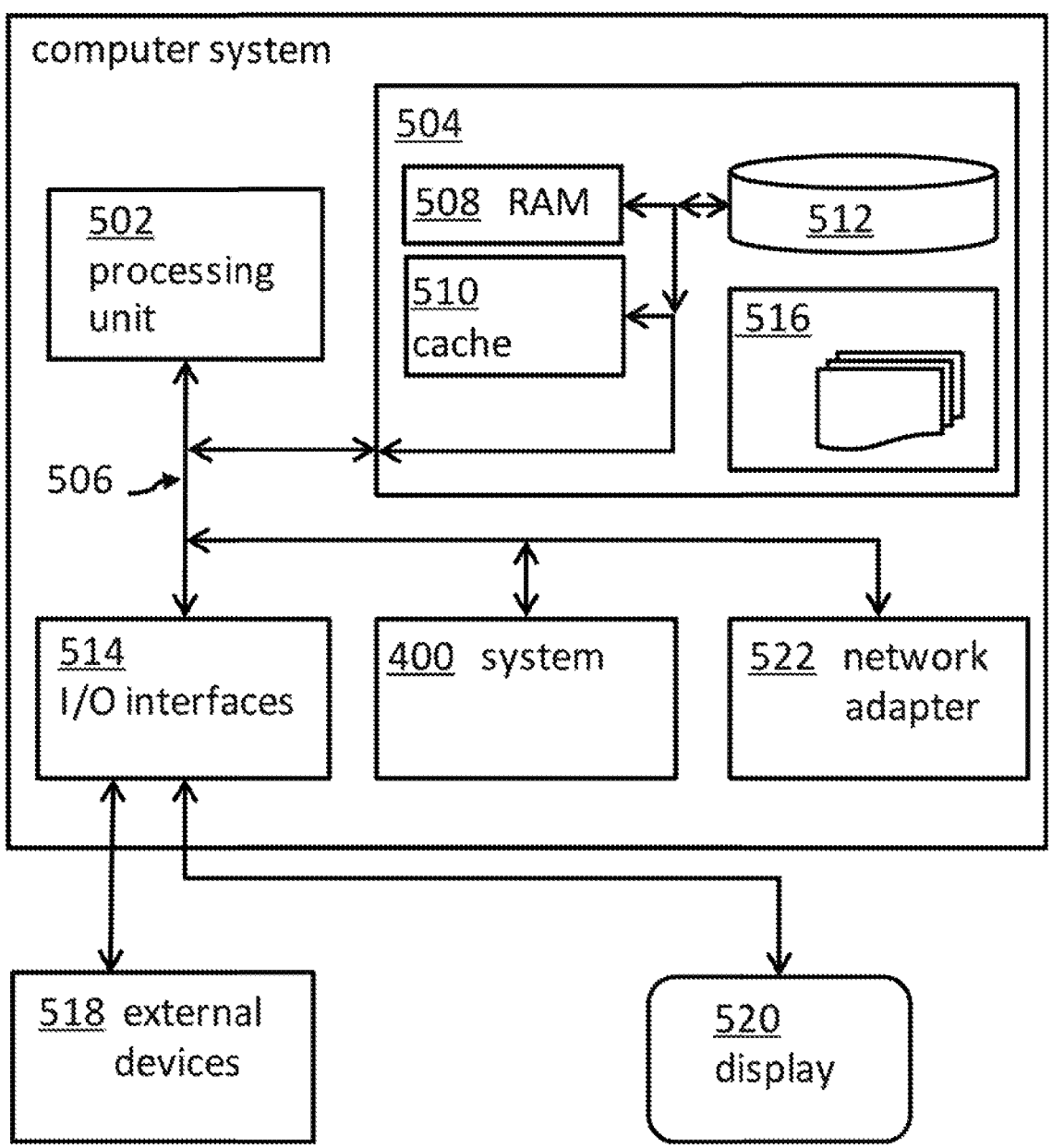
Figure 6:
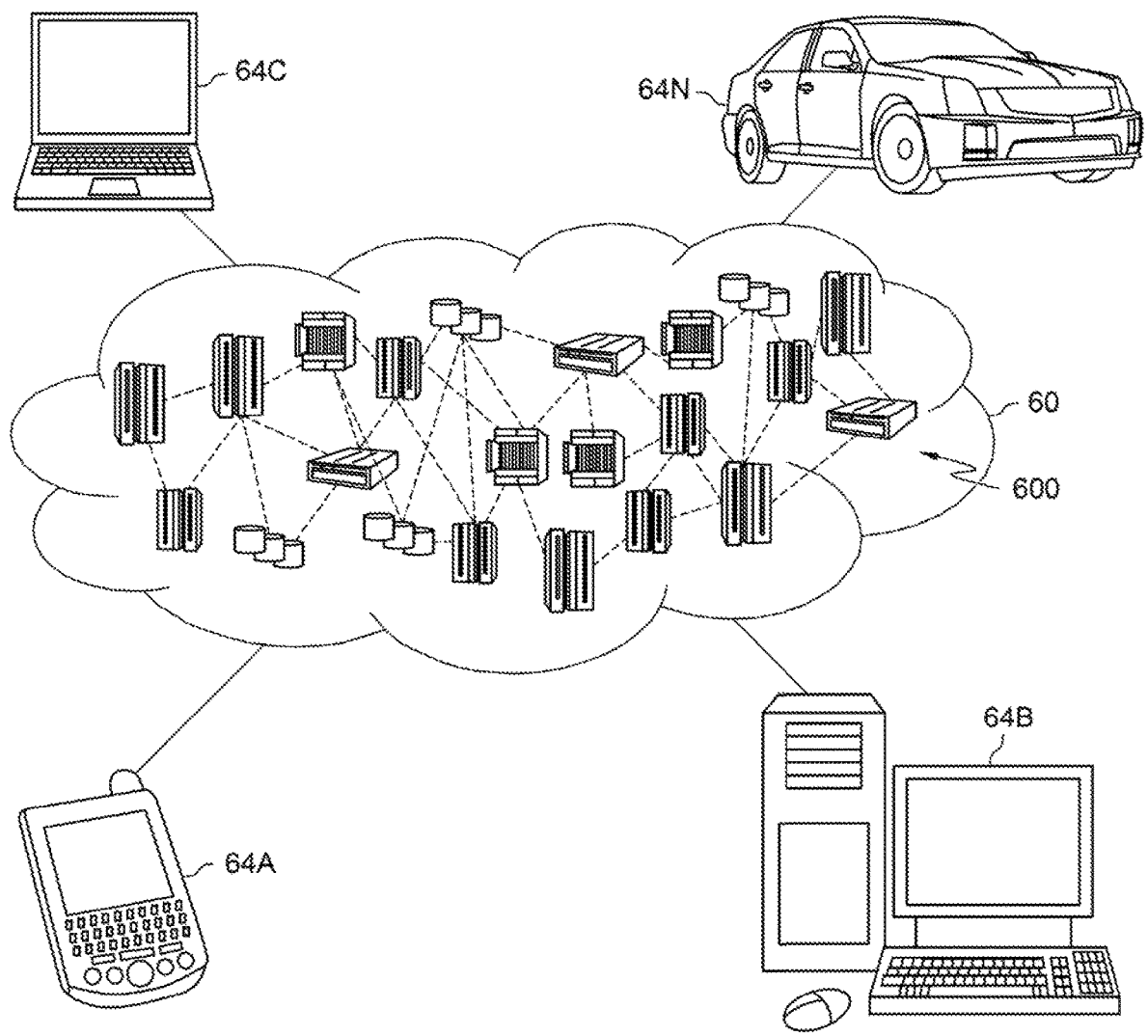
Figure 7:
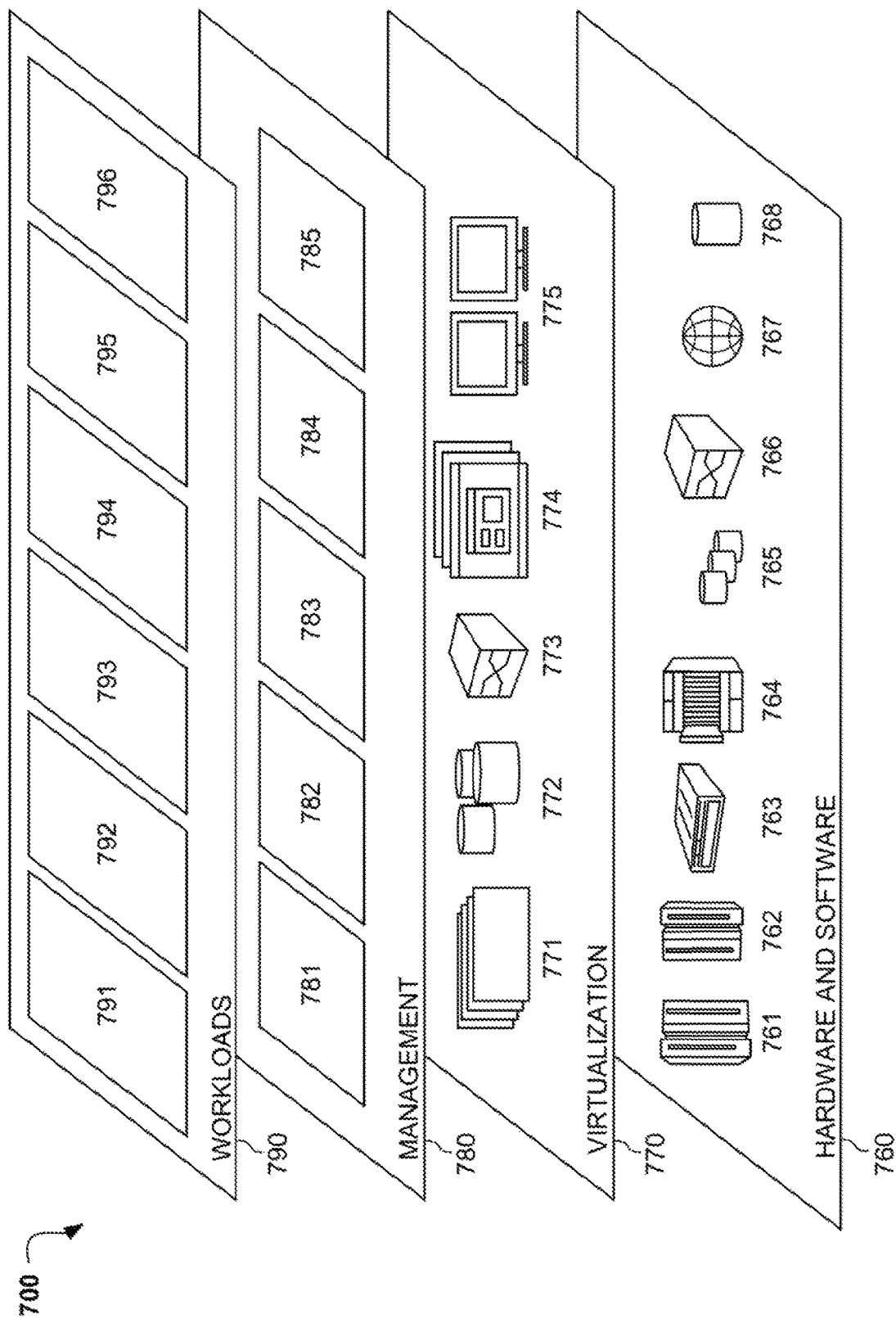

Preferred embodiments of the invention will be described, by way of example only, and with reference to the following drawings:

FIG. 1 shows a block diagram of an embodiment of the inventive computer-implemented method for migrating a source container with a running application from a source container management system to a target container management system comprising a target file system;

FIG. 2 shows a block diagram 200 of an embodiment of the inventive concept with involved components;

FIG. 3 shows a block diagram of an embodiment of a state diagram of main components instrumental for the stateful migration of a software container;

FIG. 4 shows a block diagram of an embodiment of the container migration system for a migration of a software container from a source environment to a target environment;

FIG. 5 shows a block diagram of an embodiment of a computing system comprising the container migration system according to FIG. 4;

FIG. 6 depicts a cloud computing environment according to an embodiment of the present invention; and FIG. 7 depicts abstraction model layers according to an embodiment of the present invention.

DETAILED DESCRIPTION

In the context of this description, the following conventions, terms and/or expressions may be used:

The term 'container'—or more precisely, software container—may denote the concept of virtualizing computing resources. Operating system virtualization—in contrast to hardware virtualization—refers to the operating system paradigm in which the kernel allows the existence of multiple isolated user-space instances. Such instances may be called containers (in the Solaris® or Docker® environment), virtual private servers (in the OpenVZ® environment), partitions or virtual environments (VEs) or virtual kernels (in the DragonFly BSD environment) or jails (in the FreeBSD jail or chroot jail computing environment). Solaris is a registered trademark of Linus Torvalds. OpenVZ® is an operating system level virtualization technology for Linux. OpenVZ is a trademark of SWsoft, Inc. FreeBSD is an operating system used to power servers, desktops and embedded platforms.

Such containers may look like real computers from the point of view of programs/applications running on (or in) them. A computer program being executed on an ordinary operating system may see and access all resources (connected devices, files and folders, network entry points, CPU power, quantifiable hardware capabilities, etc.) of that computer. However, programs running inside of the container may only see the containers content and devices assigned to that container. A major advantage of such a computing environment is that containers are light-weight and do not carry the overhead of complete virtual machines.

The term 'migrating' may denote here the process of shutting down a source container executing an application, move it completely—including its actual status—at runtime of the application to a new, target container.

The term 'source container' may denote the computing environment of the application being initially instantiated, whereas the term 'target container' may denote the computing environment for the same application to be instantiated and taking over the running application including its statuses.

The term 'running application' may denote, e.g., a booking application, or any other transactional system being controlled by different statuses of the application which is executed completely or partially initially in the source container and finally in the target container. It may be emphasized that the application—which may also be only a portion of a complete application, i.e., a service—is not backed up and/or written to a persistent storage. This would require that the application would be halted or paused, i.e., it would not be in a running or executing status. Instead the here proposed concept performs the migration for a running application without any halt or pause steps, i.e., perform a life-migration.

The term 'container management system' may denote the infrastructure required to manage, execute and control software containers. One example may be Kubernetes®. Other examples may include Docker®, Apache Mesos®, Rkt, Packer, Linux® Containers, Shipyard, CloudSlang or Openshift®. Apache Mesos is an open source project to manage computer clusters. Rkt is a container system. Packer is an open source tool for creating identical machine images for multiple platforms from a single source configuration. Linux is a registered trademark of Linus Torvalds. Shipyard is a web based tool to manage Docker® resources. CloudSlang is an open source tool for orchestrating technologies.

The term 'container motion daemon' may denote software code being executed as part of a container—here, the source container, the host container, and the target container, respectively—being instrumental for supporting the migration of the source container to the target container. The container motion daemons are controlled by the container motion controller. The container motion controller may activate functions in the container motion controllers, like a connection between the source container motion daemon to the target container motion daemon. The container motion controller may also initiate synchronization between the source container and the target container.

The term 'host container' may denote a core container management system being executed in the target container management system with the task to provide an execution environment for the target container. A special task of the host container daemon is to write data into the target memory of the target container. The ability to write data to the target memory may be required for the synchronization process between memories of the source container and the target container. It may be noted that only the host container daemon may write these data to the memory of the target container which runs within the host container (target memory).

Thus, the term 'encapsulated container environment' may denote the host container delivering the execution environment for the target container.

The term 'source persistent volume' may denote storage accessible by the source container. The source persistent volume may be defined by a persistent volume claim related to the source container. Consequently, the term 'target persistent volume' may denote storage accessible by the target container. Its characteristic may be defined by the persistent volume claim of the target container.

The term 'local disk path' may denote an address pointer required by a container to access its persistent storage.

The term 'network flow' may denote, e.g., network addresses—real or virtual—in order to enable a communication outside the container and/or the related container management system.

In the following, a detailed description of the figures will be given. All instructions in the figures are schematic. Firstly, a block diagram of an embodiment of the inventive computer-implemented method for migrating a source container with a running application from a source container management system to a target container management system comprising a target file system is given. Afterwards, further embodiments, as well as embodiments of the container migration system, will be described.

FIG. 1 shows a block diagram of an embodiment of the computer-implemented method 100 for migrating a source container with a running application, from a source container management system—e.g., Kubernetes®—comprising a source file system, to a target container management system, comprising a target file system. The method comprises providing, block 102, a source container motion daemon which is executed in the source container management system, and a target container motion daemon which is executed in the target container management system. The method 100 also comprises creating, block 104, a host container hosting an encapsulated container environment—i.e., a Kubernetes®-like structure in the host container—in the target container management system. Thereby, the host container is adapted for executing a host container motion daemon and the target container—which is now encapsulated by the host container—using a base image of the source container.

Next, the method 100 comprises connecting, block 106, a container motion controller to the source container motion daemon, the target container motion daemon and the host container motion daemon, and copying, block 108, content of a source memory of the source container to a target memory via the source container motion daemon and the host container motion daemon under control of the container motion controller. It may be noted that the host controller motion daemon can overwrite the memory of the target container.

FIG. 2 shows a block diagram 200 of an embodiment of the inventive concept with involved components. An upper side of the figure shows components relating to a source container 202, whereas a lower side of the figure shows components relating to a target container 204. The source container 202 runs in the environment of a source container management system 206 and accesses source container memory 208. The source container 202 also accesses a source file system 210 which is detailed as stacked components 212 (from bottom to top): base code, web-server, middleware, daemon, local data, wherein the base image consists of the first four of the five components. The source file system 210 is defined by persistent volume claim (PVC) which is then used as persistent volume 214.

On a target side (lower part of the figure), more elements are required. Beside a target container management system 226, the target container 204, a target container memory 228, a target file system 230 with stacked components 232 defined by target persistent volume 234, a host container 240 enables the execution of the target container 204. This marks the asymmetry to the source side. A host container motion daemon 238 is responsible for memory synchronization between the source container memory 208 and the target container memory 228.

In addition, a container motion controller 220 manages a source container motion daemon 216, a target container motion daemon 236, as well as the initiation of the communication between the source controller motion daemon 216, the target container motion daemon 236 and the host container motion daemon 238. The connection between the source container motion daemon 216 and the target container motion daemon 236 enables the synchronization between disk systems (storage systems) of the source and the target container, specifically persistent volume 214 of the source container 202 and target persistent volume 234 of the host container 240.

It may be noted that on the target side two container motion daemons are implemented in order to allow a stateful migration from the source container 202 to the target container 204. Basically, the instrument to achieve this is on the host container 240 and includes the host container motion daemon 238 and the target container motion daemon 236. As can be seen from the figure, there is no requirement to store the status of the source container 202 in any additional (or existing) storage volume in order to enable a stateful migration to the source container 204.

FIG. 3 shows a block diagram of an embodiment of a state diagram 300 of main components instrumental for the stateful migration of a software container. Basically, different activities of the three components, a container motion controller (CMC) 302 (compare 220 in FIG. 2), a source container motion daemon (SCMD) 304 (compare 216 in FIG. 2), a target container motion daemon (TCMD) 306 (compare 236 in FIG. 2) are shown.

First, the container motion controller 302 executes two steps: connecting and controlling the source container motion daemon 216 in the source container 202, block 308, and requesting a container image and persistent volume information (PVC) from the source container 202, block 310. Based on this, the source container motion daemon 304 provides the image and the PVC information, block 312.

Next, the container motion controller 302 ensures, block 314, the presence of the original image on the target container management system 226, creates, block 316, the host container 240 in the target container management system 226, creates, block 318, the target container 204 in the host container 240, and connects and controls, block 320, the target container motion daemon 236 in the target container 204.

After that, the source container motion daemon 304 sends, block 322, local and PV disk content to the target container motion daemon 236 and starts the related synchronization process before the source container motion daemon 304 sends, block 324, the source container memory 208 to the target container motion daemon 236 and enables thus the related synchronization process.

In parallel, or interlinked to/with these actions of the source container motion daemon 304, the target container motion daemon 306 receives, block 326, local and PV disk content from the source container motion daemon 216 and enables the related synchronization process. Then, the target container motion daemon 306 receives, block 328, the source container memory 208 content from the source container motion daemon 216 and enables the memory synchronization process.

The action then goes back to the container motion controller 302 for adapting, block 330, network settings from the source container management system 206 to the target container management system 226 environment, as well as controls, block 332, a switch from the source container 202 to the target container 204. On the source container motion daemon 304 side, this equals switching, block 334, the source container 202 to a passive mode; on the target container motion daemon 308 side, this equals switching, block 336, the target container 204 to an active mode simultaneously.

For completeness reasons, FIG. 4 shows a block diagram of an embodiment of a container migration system 400 for a migration of a software container from a source environment to a target environment. The container migration system 400 for migrating a source container executes moving an application (running application) from the source container management system 206 to the target container management system 226. The source container management system 206 comprises and manages the source file system 210, whereas the target file system 230 comprises and manages the container migration system 400.

The container migration system 400 comprises a providing module 402. It is adapted for providing the source container motion daemon 216, which is executed in the source container management system 206. The providing module 402 is also adapted for providing the target container motion daemon 236 which is executed in the target container management system 236.

Moreover, the container migration system 400 comprises a creation unit 404 which is adapted for creating the host container 240 which is hosting an encapsulated container environment in the target container management system 226. The host container 240 is adapted for executing the host container motion daemon 238 and the target container 204 using a base image of the source container 202.

Furthermore, the container migration system 400 comprises a connection unit 406, which is adapted for connecting communicatively the container motion controller 220 to the source container motion daemon 216, the target container motion daemon 236 and the host container motion daemon 238, and a copy module 408, which is adapted for copy content of the source container memory 208 of the source container 202 to the target container memory 228 via the source container motion daemon 236 and the host container motion daemon 238 under control of the container motion controller 220.

Embodiments of the invention may be implemented together with virtually any type of computer, regardless of the platform being suitable for storing and/or executing program code.

FIG. 5 shows, as an example, a computing system 500 suitable for executing program code related to the proposed method. The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the container migration system 400 for migrating a source container to a target container may be attached to the bus system 506.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 640A, desktop computer 640B, laptop computer 640C, and/or automobile computer system 640N may communicate. Cloud computing nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640A-N shown in FIG. 6 are intended to be illustrative only and that cloud computing nodes 610 and cloud computing environment 600 can communicate with any type of computerized device over any type of network and/or network addressable connection (e.g., using a web browser).

Referring now to FIG. 7, a set of functional abstraction layers provided by cloud computing environment 600 (as shown in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772, for example the system memory 504 as shown in FIG. 5; virtual networks 773, including virtual private networks; virtual applications and operating systems 774; and virtual clients 775.

In an example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and container migration system program 796. The container migration system program 796 may manage migration of a software container from a source environment to a target environment.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized in the following clauses:

1. A computer-implemented method for migrating a source container with a running application, from a source container management system comprising a source file system, to a target container management system comprising a target file system, the method comprising
   providing a source container motion daemon being executed in the source container management system and a target container motion daemon being executed in the target container management system,
   creating a host container hosting an encapsulated container in the target container management system, the host container being adapted for executing a host container motion daemon and the target container using a base image of the source container,
   connecting a container motion controller to the source container motion daemon, the target container motion daemon and the host container motion daemon, and
   copying content of a source memory of the source container to a target memory via the source container motion daemon and the host container motion daemon under control of the container motion controller.

2. The method according to clause 1, also comprising
   discovering the source persistent volume of the source container using the source container motion daemon controlled by the container motion controller.

3. The method according to clause 1 or 2, also comprising
   providing a target persistent volume in the target container management system corresponding to the source persistent volume by copying local disk paths from the source file system to the target file system.

4. The method according to any of the preceding clauses, also comprising
   coupling communicatively the target persistent volume to the target container.

5. The method according to any of the preceding clauses, wherein the copying content also comprises
   coupling communicatively the source container motion daemon to the host container motion daemon.

6. The method according to any of the preceding clauses, also comprising
   updating dirty pages from the source container being executed in the source container management system to the target container.

7. The method according to any of the preceding clauses, also comprising adopting a network flow to and from the source container to point into the target container.

8. The method according to any of the preceding clauses, wherein the source container management system is different to the target container management system.

9. The method according to any of the preceding clauses, wherein on of the source container management system and the target container management system is Kubernetes®.

10. The method according to any of the preceding clauses,
    wherein the source file system comprises a respective container base, a web-server, middleware and the source container motion daemon, and
    wherein the target file system comprises a respective container base, a web-server, middleware and the target container motion daemon.

11. The method according to any of the preceding clauses, also comprising
    setting the source container into a passive mode and setting the target container into an active mode.

12. The method according to any of the preceding clauses, also comprising
    using a binary conversion algorithm during copying content of a source memory of the source container to a target memory.

13. A container migration system for migrating a source container with a running application, from a source container management system comprising a source file system, to a target container management system comprising a target file system, the container migration system comprising
    a proving module adapted for providing a source container motion daemon being executed in the source container management system and a target container motion daemon being executed in the target container management system,
    a creation unit adapted for creating a host container hosting an encapsulated container environment in the target container management system, the host container being adapted for executing a host container motion daemon and the target container using a base image of the source container,
    a connection unit adapted for connecting a container motion controller to the source container motion daemon, the target container motion daemon and the host container motion daemon,
    a copy module adapted for copy content of a source memory of the source container to a target memory via the source container motion daemon and the host container motion daemon under control of the container motion controller.

14. The system according to clause 13, also comprising
    a discovery unit adapted for discovering the source persistent volume of the source container using the source container motion daemon controlled by the container motion controller.

15. The system according to clause 13 or 14, also comprising
    a providing unit adapted for providing a target persistent volume in the target container management system corresponding to the source persistent volume by copying local disk paths from the source file system to the target file system.

16. The system according to any of the clauses 13 to 15, also comprising
    a coupling module adapted for coupling communicatively the target persistent volume to the target container.

17. The system according to any of the clauses 13 to 16, wherein the copy module is also adapted for
    coupling communicatively the source container motion daemon to the host container motion daemon.

18. The system according to any of the clauses 13 to 17, also comprising
    an updating unit adapted for updating dirty pages from the source container being executed in the source container management system to the target container.
19. The system according to any of the clauses 13 to 18, also comprising
    an adapting module adapted for adapting a network flow to and from the source container to point into the target container.
20. The system according to any of the clauses 13 to 19, wherein the source container management system is different to the target container management system.
21. The system according to any of the clauses 13 to 20, wherein one of the source container management system and the target container management system is Kubernetes®.
22. The system according to any of the clauses 13 to 21, wherein the source file system comprises a respective container base, a web-server, middleware and the source container motion daemon and wherein the target file system comprises a respective container base, a web-server, middleware and the target container motion daemon.
23. The system according to any of the clauses 13 to 22, also comprising
    a setting module adapted for setting the source container into a passive mode and setting the target container into an active mode.
24. The system according to any of the clauses 13 to 23, also comprising
    a conversion system adapted for using a binary conversion algorithm during copying content of a source memory of the source container to a target memory.
25. A computer program product for migrating a source container with a running application, from a source container management system comprising a source file system, to a target container management system comprising a target file system, the computer program product comprising a computer readable storage medium having program instructions embodied therewith, the program instructions being executable by one or more computing systems or controllers to cause the one or more computing systems to
    provide a source container motion daemon being executed in the source container management system and a target container motion daemon being executed in the target container management system,
    create a host container hosting an encapsulated container environment in the target container management system, the host container being adapted for executing a host container motion daemon and the target container using a base image of the source container,
    connect a container motion controller to the source container motion daemon, the target container motion daemon and the host container motion daemon,
    copy content of a source memory of the source container to a target memory via the source container motion daemon and the host container motion daemon under control of the container motion controller.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for migrating a source container with a running application, from a source container management system comprising a source file system, to a target container management system comprising a target file system, the method comprising:
   providing a source container motion daemon being executed in the source container management system and a target container motion daemon being executed in the target container management system;
   creating a host container hosting an encapsulated target container in the target container management system, the host container being adapted for executing a host container motion daemon and the encapsulated target container using a base image of the source container;
   connecting a container motion controller to the source container motion daemon, the target container motion daemon and the host container motion daemon, wherein the container motion controller manages both the source container motion daemon and the target container motion daemon;
   initiating communication between the source container motion daemon and the target container motion daemon by the container motion controller, which enables synchronization between persistent volume of the source file system of the source container and target persistent volume of the target file system of the encapsulated target container;
   requesting the base image of the source container image and source container persistent volume information from the source container motion daemon by the container motion controller;
   providing the base image of the source container and the source container persistent volume information by the source container motion daemon to the target container motion daemon;
   ensuring presence of the source container image on the target container management system by the container motion controller;
   sending source container memory of the source container and persistent volume claim of the source container by the source container management system;
   receiving the source container memory of the source container and the persistent volume claim of the source container by the target container motion daemon;
   adapting network settings from the source container management system to the target container management system by the container motion controller; and
   controlling by the container motion controller simultaneous switching of setting the source container into a passive mode by the source container motion daemon and setting the target container into an active mode by the target container motion daemon.

2. The method according to claim 1, further comprising:
   discovering the source persistent volume of the source container using the source container motion daemon controlled by the container motion controller.

3. The method according to claim 1, further comprising:
   providing a target persistent volume in the target container management system corresponding to the source persistent volume by copying local disk paths from the source file system to the target file system.

4. The method according to claim 1, further comprising:
coupling communicatively the target persistent volume to the encapsulated target container.

5. The method according to claim 1, wherein the copying content further comprises:
coupling communicatively the source container motion daemon to the host container motion daemon.

6. The method according to claim 1, further comprising:
updating dirty pages from the source container being executed in the source container management system to the encapsulated target container.

7. The method according to claim 1, further comprising:
adopting a network flow to and from the source container to point into the encapsulated target container.

8. The method according to claim 1, wherein the source container management system is different than the target container management system.

9. The method according to claim 1, wherein one of the source container management system and the target container management system is Kubernetes®.

10. The method according to claim 1,
wherein the source file system comprises a respective container base, a web-server, middleware and the source container motion daemon, and
wherein the target file system comprises a respective container base, a web-server, middleware and the target container motion daemon.

11. The method according to claim 1, further comprising:
using a binary conversion algorithm during copying content of a source memory of the source container to a target memory of the encapsulated target container.

12. A container migration system for migrating a source container with a running application, from a source container management system comprising a source file system, to a target container management system comprising a target file system, the container migration system comprising:
a providing module adapted for providing a source container motion daemon being executed in the source container management system and a target container motion daemon being executed in the target container management system;
a creation unit adapted for creating a host container hosting an encapsulated target container environment in the target container management system, the host container being adapted for executing a host container motion daemon and the encapsulated target container using a base image of the source container;
a connection unit adapted for connecting a container motion controller to the source container motion daemon, the target container motion daemon and the host container motion daemon, wherein the container motion controller manages both the source container motion daemon and the target container motion daemon;
communication between the source container motion daemon and the target container motion daemon managed by the container motion controller, which enables synchronization between persistent volume of the source file system of the source container and target persistent volume of the target file system of the encapsulated target container; and
a copy module adapted for copy content of the base image of the source container image and source container persistent volume information to a target container via the source container motion daemon and the host container motion daemon under control of the container motion controller.

13. The system according to claim 12, further comprising:
a discovery unit adapted for discovering the source persistent volume of the source container using the source container motion daemon controlled by the container motion controller.

14. The system according to claim 12, further comprising:
a providing unit adapted for providing a target persistent volume in the target container management system corresponding to the source persistent volume by copying local disk paths from the source file system to the target file system.

15. The system according to claim 12, further comprising:
a coupling module adapted for coupling communicatively the target persistent volume to the encapsulated target container.

16. The system according to claim 12, wherein the copy module is also adapted for coupling communicatively the source container motion daemon to the host container motion daemon.

17. The system according to claim 12, further comprising:
an updating unit adapted for updating dirty pages from the source container being executed in the source container management system to the encapsulated target container.

18. The system according to claim 12, further comprising:
an adapting module adapted for adapting a network flow to and from the source container to point into the encapsulated target container.

19. The system according to claim 12, wherein the source container management system is different than the target container management system.

20. The system according to claim 12, wherein one of the source container management system and the target container management system is Kubernetes®.

21. The system according to claim 12, wherein the source file system comprises a respective container base, a web-server, middleware and the source container motion daemon and wherein the target file system comprises a respective container base, a web-server, middleware and the target container motion daemon.

22. The system according to claim 12, further comprising:
a conversion system adapted for using a binary conversion algorithm during copying content of a source memory of the source container to a target memory of the encapsulated target container.

23. A computer program product for migrating a source container with a running application, from a source container management system comprising a source file system, to a target container management system comprising a target file system, the computer program product comprising a computer readable storage medium having program instructions embodied therewith, the program instructions being executable by one or more computing systems or controllers to cause the one or more computing systems to:
provide a source container motion daemon being executed in the source container management system and a target container motion daemon being executed in the target container management system;
create a host container hosting an encapsulated target container environment in the target container management system by the host container motion daemon, the host container being adapted for executing a host container motion daemon and the target container using a base image of the source container;
connect a container motion controller to the source container motion daemon, the target container motion daemon and the host container motion daemon, wherein the container motion controller manages both the source container motion daemon and the target container motion daemon;

initiate communication between the source container motion daemon and the target container motion daemon by the container motion controller, which enables synchronization between persistent volume of the source file system of the source container and target persistent volume of the target file system of the target container;

request the base image of the base image of the source container and source container persistent volume information from the source container motion daemon by the container motion controller;

provide the base image of the source container and the source container persistent volume information by the source container motion daemon to the target container motion daemon;

ensure presence of the source container image on the target container management system by the container motion controller;

send source container memory of the source container and persistent volume claim of the source container by the source container management system;

receive the source container memory of the source container and the persistent volume claim of the source container by the target container motion daemon;

adapt network settings from the source container management system to the target container management system by the container motion controller; and the container motion controller simultaneous switching of setting the source container into a passive mode by the source container motion daemon and setting the target container into an active mode by the target container motion daemon.

\* \* \* \* \*